United States Patent
Naganuma

[11] Patent Number: 6,101,025
[45] Date of Patent: Aug. 8, 2000

[54] OPTICAL REPEATER HAVING REDUNDANCY

[75] Inventor: Norihisa Naganuma, Sapporo, Japan

[73] Assignee: Fujitsu Limited, Kawasaki, Japan

[21] Appl. No.: 08/667,125

[22] Filed: Jun. 20, 1996

[30] Foreign Application Priority Data

Sep. 26, 1995 [JP] Japan .................................. 7-247118

[51] Int. Cl.[7] .............................. H01S 3/13; H01S 3/091; G02B 6/36

[52] U.S. Cl. ......................... 359/341; 359/134; 359/160; 372/6

[58] Field of Search .................................. 359/134, 141, 359/160, 188, 341; 372/6

[56] References Cited

U.S. PATENT DOCUMENTS

| | | | |
|---|---|---|---|
| 5,173,957 | 12/1992 | Bergano et al. | |
| 5,406,411 | 4/1995 | Button et al. | 359/341 |
| 5,497,265 | 3/1996 | Fontana et al. | 359/160 |
| 5,506,723 | 4/1996 | Junginger | 359/134 |
| 5,581,397 | 12/1996 | Maki et al. | 359/341 |
| 5,801,878 | 9/1998 | Bourret et al. | 351/341 |
| 5,808,786 | 9/1998 | Shibuya | 359/160 |

FOREIGN PATENT DOCUMENTS 2284926  6/1995  United Kingdom .

OTHER PUBLICATIONS

Delavaux et al, IEEE Photonics Tech. Letters, vol. 6, #3, pp. 376–379, Mar. 1994.

Primary Examiner—Nelson Moskowitz
Attorney, Agent, or Firm—Staas & Halsey, LLP

[57] ABSTRACT

An optical repeater having a first optical amplifier for a first optical fiber transmission line and a second optical amplifier for a second optical fiber transmission line. Each of the first and second optical amplifiers has a doped fiber doped with a rare earth element, a pumping light source for outputting pumping light, a supplying optical coupler for supplying the pumping light to the doped fiber, and an extracting optical coupler for extracting the pumping light. Each extracting optical coupler has an exchange port for outputting a part of the pumping light remaining in the corresponding doped fiber after pumping. The optical repeater further has an optical fiber for connecting the exchange ports in the first and second optical amplifiers to exchange the pumping light. With this configuration, even if one of the pumping light sources has failed, the pumping light from the other pumping light source is supplied to both doped fibers, thereby making the optical repeater have redundancy.

24 Claims, 5 Drawing Sheets

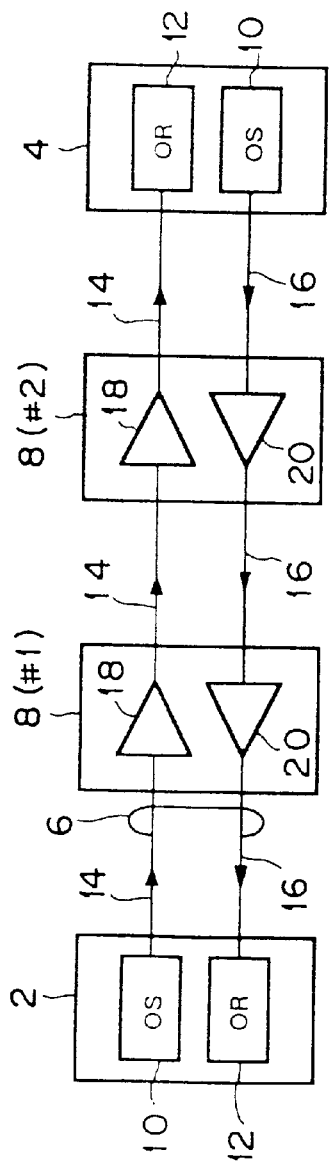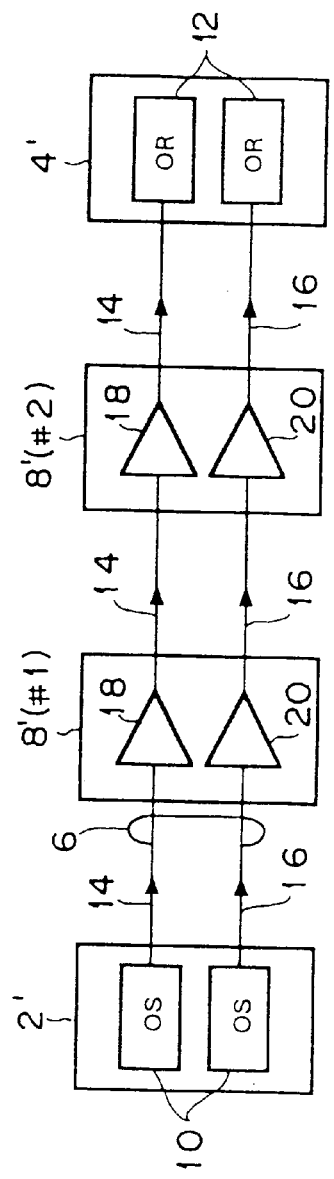

OPTICAL REPEATER HAVING REDUNDANCY

BACKGROUND OF THE INVENTION

1. Field of the Invention

The present invention relates generally to an optical repeater applicable to a system requiring high reliability, such as an optical submarine repeating transmission system, and more particularly to an optical repeater having redundancy. The wording of "having redundancy" used herein means having a capability of performing the function instead in the event that a device or a part of a system requiring high reliability has failed.

2. Description of the Related Art

An optical submarine repeating transmission system is a system for transmitting a light signal by laying a cable including an optical fiber transmission line in a submarine section between the continents or the like, wherein the light signal attenuated is repeated by optical repeaters placed on a sea bed to thereby compensate for attenuation or the like. In recent years, an optical repeater having an optical amplifier has been put to practical use, and it has been desired to improve the reliability of the optical repeater and reduce the cost thereof.

Known as the optical amplifier used in the optical repeater is an optical amplifier including a doped fiber doped with a rare earth element such as Er (erbium), a pumping light source for outputting pumping light, and an optical coupler operatively connected to either a signal light input end or a signal light output end of the doped fiber, for supplying the pumping light to the doped fiber. When the optical coupler is operatively connected to the signal light input end of the doped fiber, the signal light and the pumping light propagate through the doped fiber in the same direction, whereas when the optical coupler is operatively connected to the signal light output end of the doped fiber, the signal light and the pumping light propagate through the doped fiber in opposite directions. In both cases, the doped fiber is pumped by the pumping light. When the signal light is supplied to the doped fiber in its pumped condition, the signal light is amplified. In the case where the optical repeater is applied to an optical cable including two, up and down optical fiber transmission lines, two optical amplifiers, one for the up optical fiber transmission line and the other for the down optical fiber transmission line, are incorporated in the optical repeater.

In general, a laser diode usually employed as the pumping light source is less reliable than a passive optical component such as an optical coupler. Accordingly, the pumping light source is conventionally duplexed, so as to provide an optical amplifier having high reliability. In starting the operation of the optical amplifier, pumping light from a first laser diode is supplied to the doped fiber. When the first laser diode has failed during the operation, a second laser diode is selected in place of the first laser diode, and output light from the second laser diode is supplied as pumping light to the doped fiber. Since both the first and second laser diodes must be connected to the doped fiber, a polarization beam splitter is used to couple the beams of linearly polarized light output from the first and second laser diodes to one optical path. Of the components constituting an optical circuit of the optical amplifier, the laser diode is highly expensive, and the polarization beam splitter is also expensive next to the laser diode. Accordingly, the duplexing of the pumping light source substantially doubles the cost of the optical amplifier.

SUMMARY OF THE INVENTION

It is therefore an object of the present invention to provide an optical repeater having high reliability and fit for cost reduction.

The optical repeater of the present invention is applied to an optical cable including a first and a second optical fiber transmission lines each for transmitting signal light. This optical repeater comprises a first optical amplifier for the first optical fiber transmission line, and a second optical amplifier for the second optical fiber transmission line. The first optical amplifier includes a first doped fiber doped with a rare earth element as an amplifying medium for the signal light, a first pumping light source for outputting pumping light for pumping the first doped fiber, a first supplying optical coupler, and a first extracting optical coupler. The first doped fiber has a signal light input end and a signal light output end, and the first doped fiber is inserted in the midway of the first optical fiber transmission line. The first supplying optical coupler is operatively connected to one of the signal light input end and the signal light output end of the first doped fiber to supply the pumping light to the first doped fiber. The first extracting optical coupler is operatively connected to the other of the signal light input end and the signal light output end of the first doped fiber, and has an exchange port for extracting the pumping light passed through the first doped fiber and outputting the pumping light extracted.

The second optical amplifier includes a second doped fiber, a second pumping light source, a second supplying optical coupler, and a second extracting optical coupler respectively corresponding to the first doped fiber, the first pumping light source, the first supplying optical coupler, and the first extracting optical coupler. This optical repeater further comprises an exchanging means for operatively connecting the exchange port of the first extracting optical coupler and an exchange port of the second extracting optical coupler to thereby exchange a part of the pumping light between the first optical amplifier and the second optical amplifier. Since the wavelength of the signal light is generally different from the wavelength of the pumping light, a fiber-fused type wavelength coupler utilizing the wavelength dependence of a coupling ratio may be used as each of the first and second supplying optical couplers and the first and second extracting optical couplers.

In the optical repeater of the present invention, the exchange port of the first extracting optical coupler and the exchange port of the second extracting optical coupler are operatively connected together to thereby exchange a part of the pumping light between the first optical amplifier and the second optical amplifier, so that the optical repeater can be made to have redundancy. Even if the first pumping light source has failed, the pumping light from the second pumping light source is supplied to the first optical amplifier, thereby maintaining the amplifying operation in the first optical amplifier. Conversely, even if the second pumping light source has failed, the pumping light from the first pumping light source is supplied to the second optical amplifier, thereby maintaining the amplifying operation in the second optical amplifier. Accordingly, the reliability of the optical repeater can be improved. Furthermore, the optical repeater can be manufactured at a low cost as compared with the case where each of the first and second optical amplifiers includes two pumping light sources.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIGS. 1A and 1B are block diagrams of different optical repeating transmission systems to which the present invention is applicable;

DESCRIPTION OF THE PREFERRED EMBODIMENTS

Figure 2:
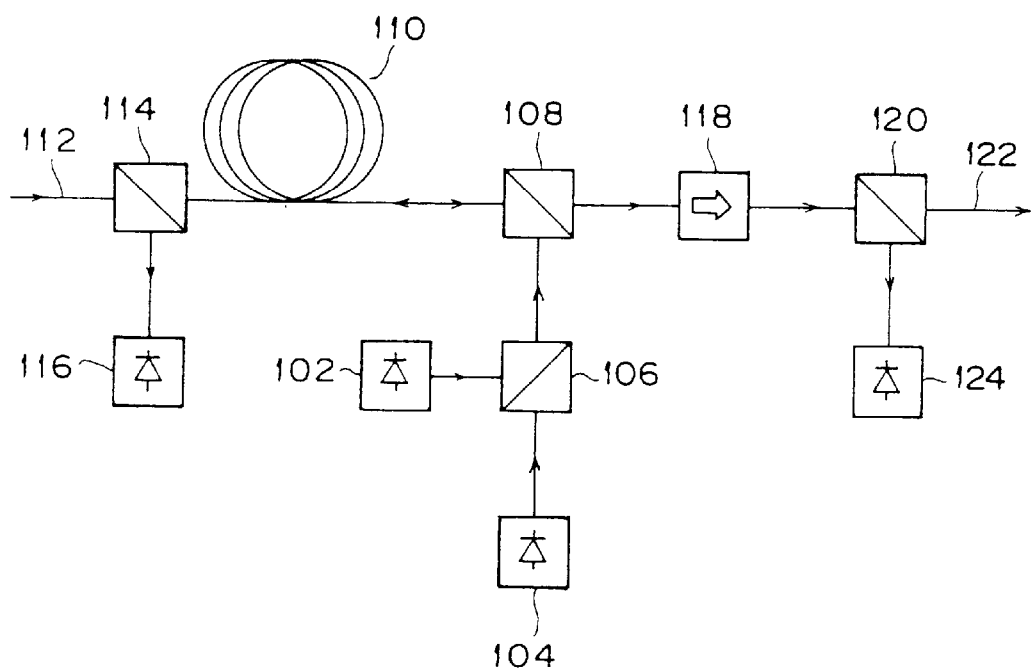
FIG. 2 is a block diagram of an optical amplifier in the prior art.

A preferred embodiment of the present invention will now be described in detail with reference to the drawings.

FIGS. 1A and 1B are block diagrams of optical repeating transmission systems to which the present invention is applicable. FIG. 1A shows a bidirectional system provided with two optical fiber transmission lines for transmitting two channels of signal light in opposite directions to allow bidirectional transmission, and FIG. 1B shows a large-capacity system provided with two optical fiber transmission lines for transmitting two channels of signal light in the same direction to allow large-capacity transmission.

The bidirectional system shown in FIG. 1A is provided with a first terminal station 2, a second terminal station 4, an optical cable 6 laid between the two terminal stations 2 and 4, and a plurality of optical repeaters 8 (#1 and #2) placed in the midway of the optical cable 6. While several to tens of optical repeaters are usually employed in one system, only the two optical repeaters 8 (#1 and #2) are shown in FIG. 1A for illustration. For bidirectional transmission, each of the terminal stations 2 and 4 has an optical sender 10 and an optical receiver 12, and the optical cable 6 includes two optical fiber transmission lines 14 and 16. The optical fiber transmission line 14 is laid between the optical sender 10 in the first terminal station 2 and the optical receiver 12 in the second terminal station 4, so as to transmit signal light in an up direction from the first terminal station 2 to the second terminal station 4. The optical fiber transmission line 16 is laid between the optical sender 10 in the second terminal station 4 and the optical receiver 12 in the first terminal station 2, so as to transmit signal light in a down direction from the second terminal station 4 to the first terminal station 2. Each of the optical repeaters 8 (#1 and #2) is provided with two optical amplifiers 18 and 20. Each optical amplifier 18 is inserted in the midway of the optical fiber transmission line 14, and each optical amplifier 20 is inserted in the midway of the optical fiber transmission line 16. According to this system, the two channels of signal light attenuated in the optical fiber transmission lines 14 and 16 are respectively amplified by the optical amplifiers 18 and 20, thereby allowing bidirectional transmission in which signal attenuation is compensated.

On the other hand, the large-capacity system shown in FIG. 1B is provided with a sending terminal station 2', a receiving terminal station 4', an optical cable 6 laid between the two terminal stations 2' and 4', and a plurality of optical repeaters 8' (#1 and #2) placed in the midway of the optical cable 6. The terminal station 2' has two optical senders 10, and the terminal station 4' correspondingly has two optical receivers 12. In this system, two optical fiber transmission lines 14 and 16 included in the optical cable 6 transmit two channels of signal light in only one direction from the terminal station 2' to the terminal station 4', and accordingly the form of locations of the optical amplifiers 18 and 20 in the optical repeaters 8' (#1 and #2) is modified. According to this system, the optical cable 6 has the two optical fiber transmission lines 14 and 16, so that the transmission capacity can be doubled over that of a single optical fiber transmission line, thereby allowing large-capacity signal light transmission.

By applying the present invention to an optical repeater having at least two optical amplifiers as shown in FIG. 1A or FIG. 1B, the optical repeater or the system can be made to have redundancy.

FIG. 2 is a block diagram showing a conventional optical amplifier applicable to an optical repeater. To make the optical repeater have redundancy, the optical amplifier shown in FIG. 2 is provided with two laser diodes 102 and 104 as pumping light sources. Pumping light from the laser diode 102 or 104 is supplied through a polarization beam splitter 106 and a wavelength coupler 108 in this order to a doped fiber 110 doped with a rare earth element such as Er. Signal light transmitted through an upstream fiber 112 and to be amplified in the doped fiber 110 is divided into a first and, a second light beam by an optical coupler 114. The first light beam is supplied to a photodiode 116, and the second light beam is input into the doped fiber 110. The propagation directions of the signal light(the second light beam) and the pumping light in the doped fiber 110 are opposite to each other. The signal light amplified in the doped fiber 110 is supplied through the wavelength coupler 108 and an optical isolator 118, in this order to an optical coupler 120. In the optical coupler 120, the signal light is divided into two light beams and fourth light beams. The third light beam is supplied to a photodiode 124, and the fourth light beam is transmitted through a downstream fiber 122 to another optical repeater on the next stage or to an optical receiver.

In starting the operation of this optical amplifier, one of the laser diodes 102 and 104 is driven. In the event that one of the laser diodes 102 and 104 fails after being driven over a long period of time, the other laser diode is selected instead. Accordingly, in manufacturing this optical amplifier, it must be designed so that light beams from both the laser diodes 102 and 104 are to be supplied to the doped fiber 110. To this end, considering the fact that output light from a laser diode is linearly polarized light in general, this prior art optical amplifier employs the polarization beam splitter 106 to supply the light beams from both the laser diodes 102 and 104 through the same optical path to the doped fiber 110. However, such making the optical repeater have redundancy by duplexing the pumping light source causes a great increase in cost as mentioned above, and assembly of optical components accompanying alignment of planes of polarization is difficult.

To cope with such defects in the prior art, the present invention has noted that each optical repeater in the systems as shown in FIGS. 1A and 1B includes at least two optical amplifiers. That is, in the event that one of two pumping light sources for two optical amplifiers fails, the other pumping light source is shared by the two optical amplifiers, thereby making the optical repeater to have redundancy. If no pumping light is supplied to a doped fiber at all, an optical amplifier with a faulty pumping light source causes a fatal defect of the system because of a large attenuation of signal light owned by the doped fiber itself. To the contrary, by making the optical repeater have redundancy according to the present invention, the probability of occurrence of such a fatal defect can be greatly suppressed.

Figure 3:
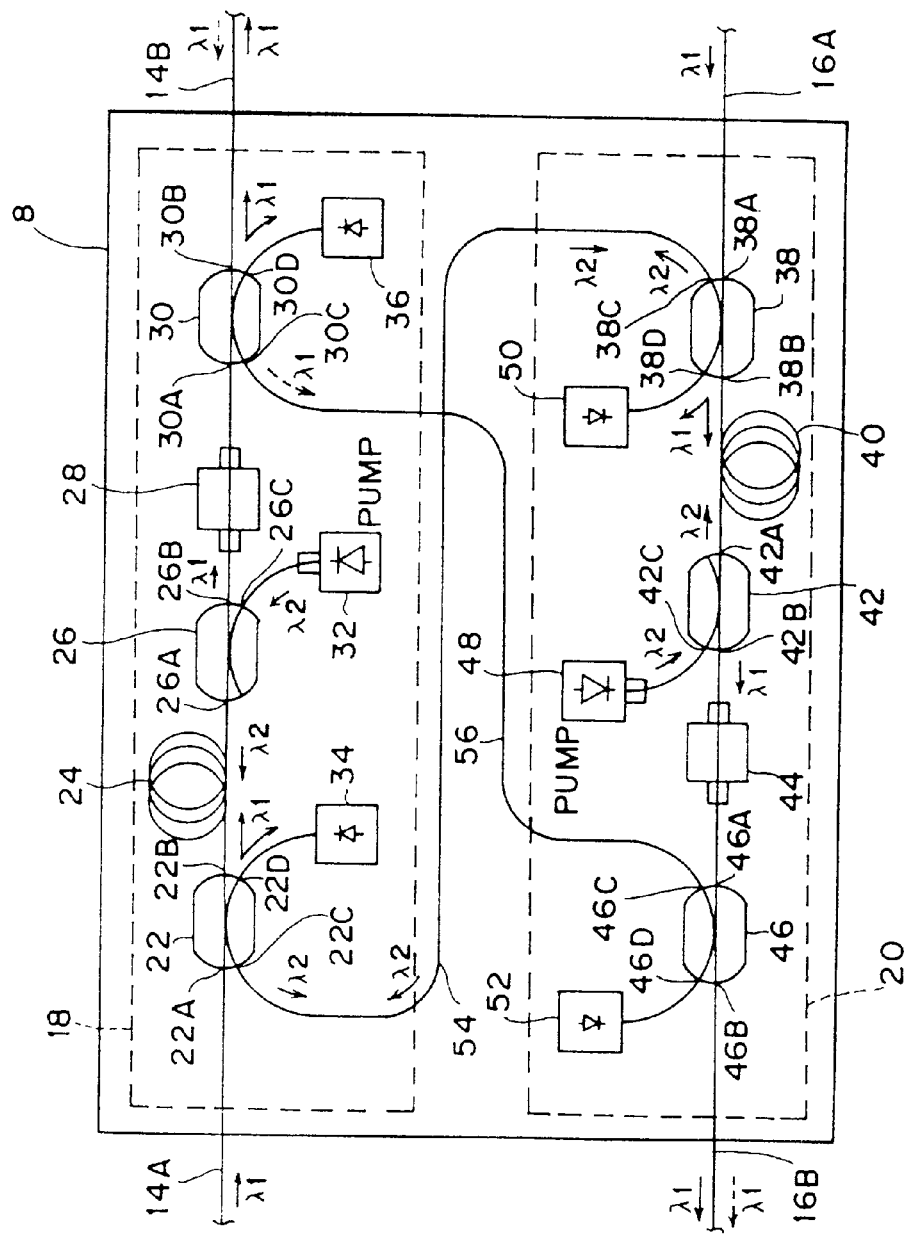
FIG. 3 is a block diagram of an optical repeater showing a preferred embodiment of the present invention.

FIG. 3 is a block diagram of an optical repeater showing a preferred embodiment of the present invention. For convenience of description, this optical repeater is assumed to be identical with the optical repeater 8 applied to the bidirectional system shown in FIG. 1A. The optical repeater 8 has the optical amplifier 18 inserted in the midway of the up optical fiber transmission line 14 and the optical amplifier 20 inserted in the midway of the down optical fiber transmission line 16. A portion of the up optical fiber transmission line 14 upstream of the optical amplifier 18 in respect of a signal light propagation direction will be hereinafter referred to as an upstream fiber 14A, and a portion of the up optical fiber transmission line 14 downstream of the optical amplifier 18 in respect of the signal light propagation direction will be hereinafter referred to as a downstream fiber 14B. Similarly, portions of the down optical fiber transmission line 16 upstream and downstream of the optical amplifier 20 will be hereinafter referred to as an upstream fiber 16A and a downstream fiber 16B, respectively.

The optical amplifier 18 for the up line has a wavelength coupler 22 for extracting pumping light, a doped fiber 24 doped with a rare earth element such as Er, a wavelength coupler 26 for supplying pumping light, an optical isolator 28, and an optical coupler 30 for searching a breakdown point in the optical fiber transmission line and monitoring output light, these be components are placed with this order along a main optical path to signal light in respect of the signal light propagation direction. The optical amplifier 18 further has a laser diode 32 as a pumping light source and photodiodes 34 and 36 for detecting signal light. In the case that the wavelength $\lambda 1$ of signal light to be amplified falls within a band of 1.55 $\mu m$, Er for example is selected as a dopant element for the doped fiber 24. In this case, the wavelength $\lambda 2$ of pumping light is set to a band of 1.48 $\mu m$, for example. More specifically, the wavelength $\lambda 1$ of the signal light and the wavelength $\lambda 2$ of the pumping light are 1558 nm and 1475 nm, respectively, for example. The wavelength coupler 22 has a port 22A connected to the upstream fiber 14A, a port 22B connected to a first end of the doped fiber 24, a port (exchange port) 22C for exchanging pumping light, and a port 22D connected to the photodiode 34.

The wavelength coupler 22 serves to divide light having a wavelength $\lambda 1$ supplied to the port 22A into first and second light. The first light beam having relatively large power is output from the port 22B, and the second light beam has relatively small power, and is output from the port 22D. The wavelength coupler 22 further outputs from the port 22C light having a wavelength $\lambda 2$ supplied to the port 22B.

A manufacturing method for such a wavelength coupler having a specific function and its characteristics will be described. In general, a wavelength coupler is obtained by fusing the side surfaces of first and second fibers and then drawing a fused portion of the fibers with heat. At a fused/drawn portion of the fibers, the diameters of two cores for guiding light become so small as not to enough confine the light, and the two cores are very close to each other. As a result, evanescent wave coupling occurs between these cores. That is, coupling occurs between the two waveguide structures. In making such a wavelength coupler correspond to the wavelength coupler 22 shown in FIG. 3, the opposite ends of the first fiber correspond to the ports 22A and 22B, and the opposite ends of the second fiber correspond to the ports 22C and 22D. By suitably defining structure parameters at the fused/drawn portion, a coupling ratio can be made to change in a limited wavelength range so as to substantially have a periodicity as of a sine function.

Figure 4:
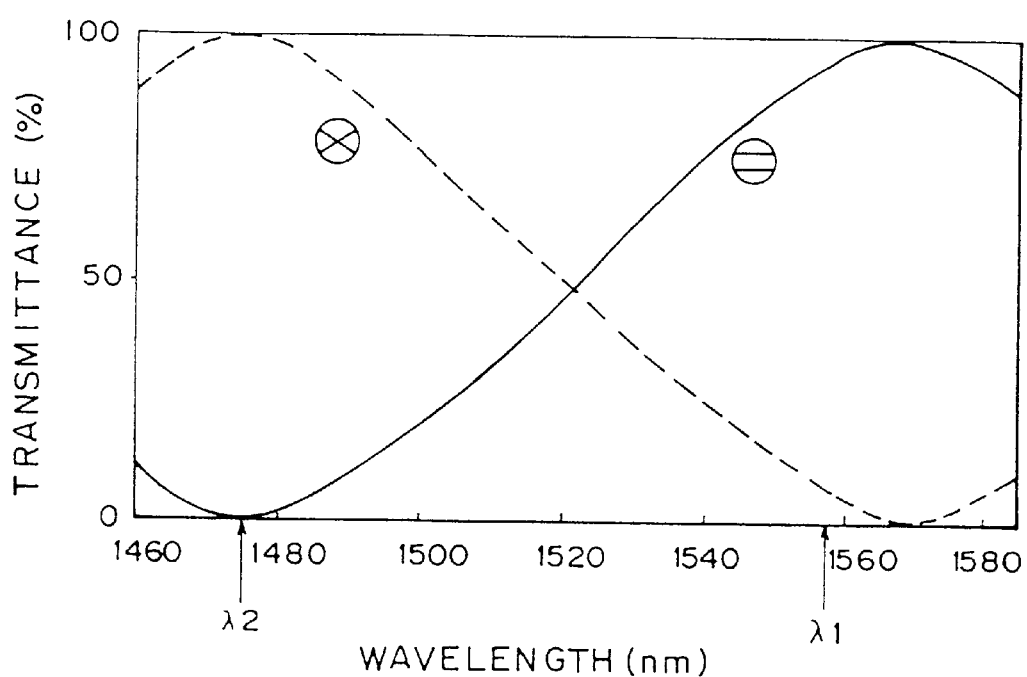
FIG. 4 is a graph showing an example of the characteristics of a wavelength coupler applicable to the optical repeater shown in FIG. 3.

FIG. 4 is a graph showing an example of the characteristics of a wavelength coupler that can be used as the wavelength coupler 22 shown in FIG. 3. In FIG. 4, the vertical axis represents transmittance (%), and the horizontal axis represents wavelength (nm). The transmittance used herein means a ratio of power of light output from a certain port to power of light input to another certain port. The characteristic shown by a solid line is the wavelength dependence of transmittance between the opposite ends of any one of the two fibers constituting the wavelength coupler, and the characteristic shown by a broken line is the wavelength dependence of transmittance from one of the two fibers to the other fiber. More specifically, the characteristic of the solid line corresponds to the transmittance from the port 22A to the port 22B or vice versa, or the transmittance from the port 22C to the port 22D or vice versa, and the characteristic of the broken line corresponds to the transmittance from the port 22A to the port 22D or vice versa, or the transmittance from the port 22C to the port 22B or vice versa. The characteristic of the solid line will be hereinafter referred to as a bar transmittance, and the characteristic of the broken line will be hereinafter referred to as a cross transmittance.

The bar transmittance is 100% at a wavelength slightly longer (e.g., by 2 nm or more) than the wavelength $\lambda 1$ of signal light, and is 0% at the wavelength $\lambda 2$ of pumping light. The bar transmittance at the wavelength $\lambda 1$ of signal light is 95%, for example. The cross transmittance is 0% when the bar transmittance is 100%, while being 100% when the bar transmittance is 0%. The cross transmittance at the wavelength $\lambda 1$ of signal light is 5%, for example. By using the wavelength coupler having such characteristics as the wavelength coupler 22 shown in FIG. 3, 95% of signal light supplied to the port 22A can be input into the doped fiber 24, and the remaining 5% of the signal light can be detected by the photodiode 34. Accordingly, the input level of signal light to the optical amplifier can be monitored without a deterioration in S/N ratio. Further, 100% of pumping light having a wavelength $\lambda 2$ supplied to the port 22B is output from the port 22C in principle. Therefore, this pumping light can be exchanged for pumping light in the other optical amplifier 20 as will be hereinafter described.

Referring again to FIG. 3, the wavelength coupler 26 has a port 26A connected to a second end of the doped fiber 24, a port 26B connected to an input port of the optical isolator 28, and a port 26C connected to the laser diode 32. The wavelength coupler 26 outputs from the port 26B light having a wavelength $\lambda 1$ supplied to the port 26A, and outputs from the port 26A light having a wavelength $\lambda 2$ supplied to the port 26C. The optical coupler 30 has ports 30A, 30B, 30C, and 30D. The port 30A is connected to an output port of the optical isolator 28. The port 30B is connected to the downstream fiber 14B. The port 30D is connected to the photodiode 36. The optical coupler 30 serves to divide light having a wavelength $\lambda 1$ supplied to the port 30A into two, first and second light beams. The first light beam having relatively large power is output from the port 30B, and the second light beam having relatively small power is output from the port 30D. Further, the optical coupler 30 serves also to divide light having a wavelength $\lambda 1$ supplied to the port 30B into two light beams, and output these two light beams from the ports 30A and 30C, respectively. The photodiode 36 is provided for the purpose of monitoring the output level of the signal light amplified in the optical amplifier 18.

The optical amplifier 20 for the down line has a wavelength coupler 38, a doped fiber 40, a wavelength coupler 42, an optical isolator 44, an optical coupler 46, a laser diode 48, a photodiode 50, and a photodiode 52 respectively corresponding to the wavelength coupler 22, the doped fiber 24, the wavelength coupler 26, the optical isolator 28, the optical coupler 30, the laser diode 32, the photodiode 34, and the photodiode 36 in the optical amplifier 18 for the up line. The wavelength coupler 38 has ports 38A, 38B, 38C, and 38D respectively corresponding to the ports 22A, 22B, 22C, and 22D of the wavelength coupler 22. The wavelength coupler 42 has ports 42A, 42B, and 42C respectively corresponding to the ports 26A, 26B, and 26C of the wavelength coupler 26. The optical coupler 46 has ports 46A, 46B, 46C, and 46D respectively corresponding to the ports 30A, 30B, 30C, and 30D of the optical coupler 30.

To effect the exchange of pumping light characteristic of the present invention, the port 22C of the wavelength coupler 22 is operatively connected through an optical fiber 54 to the port 38C of the wavelength coupler 38. To effect the search of any breakdown points in the optical fiber transmission lines, the port 30C of the optical coupler 30 is operatively connected through an optical fiber 56 to the port 46C of the optical coupler 46. The wording of "operatively connected" used in this specification means all cases of direct optical connection by means of an optical fiber, optical connection by means of a spatial beam with the use of a collimate lens system or a converging lens system, and connection by means of passive optical components such as an optical filter.

The operation of the optical repeater according to this preferred embodiment will now be described. When signal light is supplied from the upstream fiber 14A to the doped fiber 24 kept pumped by pumping light from the laser diode 32 in the optical amplifier 18, the signal light is amplified in the doped fiber 24 in accordance with the principle of stimulated emission of light. The signal light thus amplified is passed through the wavelength coupler 26, the optical isolator 28, and the optical coupler 30 in this order, and is then output to the downstream fiber 14B. Similarly in the optical amplifier 20, signal light supplied from the upstream fiber 16A is amplified in the doped fiber 40 pumped by pumping light from the laser diode 48, and the signal light thus amplified is output to the downstream fiber 16B.

In pumping the doped fiber 24 by the pumping light from the laser diode 32 in, the optical amplifier 18, the pumping light is partially absorbed by the dopant, but all proportion of the pumping light is not absorbed. The remaining pumping light not absorbed in the doped fiber 24 is extracted from the main optical path by the wavelength coupler 22. The pumping light thus extracted is supplied from the port 22C through the optical fiber 54 to the port 38C of the wavelength coupler 38. On the other hand, the pumping light extracted by the wavelength coupler 38 in the optical amplifier 20 is supplied from the port 38C through the optical fiber 54 to the port 22C of the wavelength coupler 22. The pumping light supplied to the port 22C is input from the port 22B into the doped fiber 24. Accordingly, the doped fiber 24 is pumped by a part of the pumping light from the laser diode 32 and a part of the pumping light from the laser diode 48. Similarly, the doped fiber 40 is pumped by the laser diodes 32 and 48.

Figure 5:
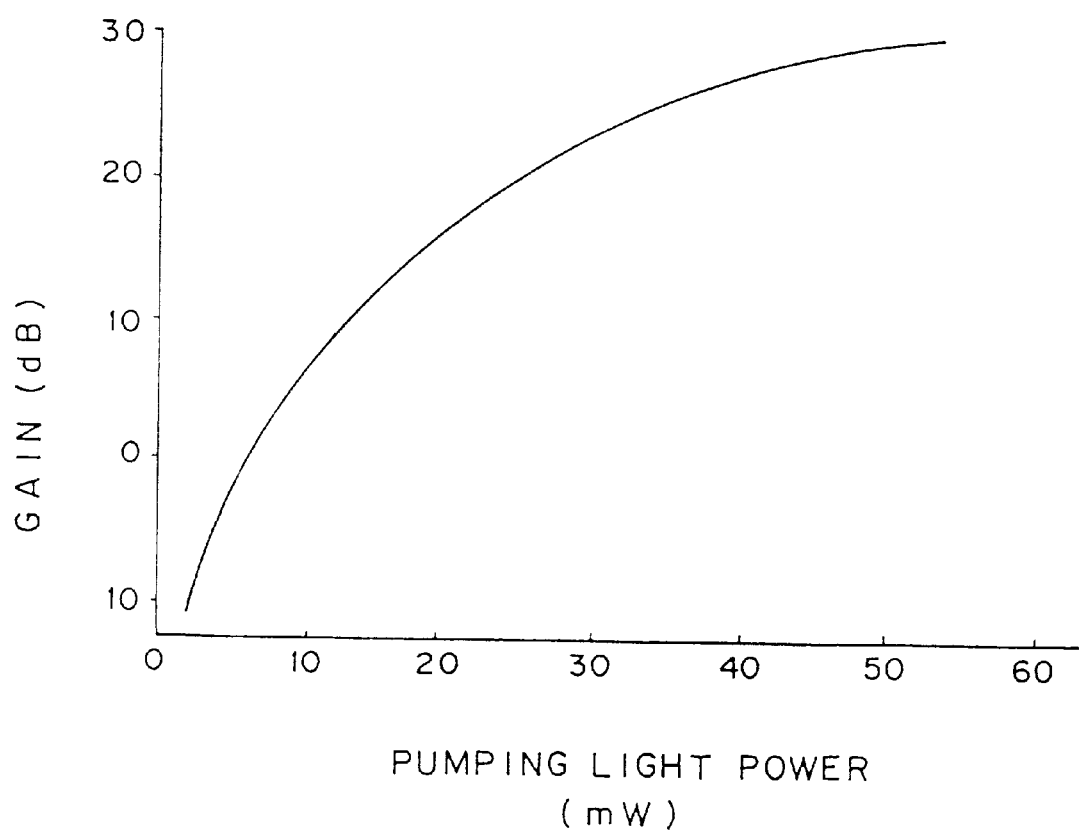
FIG. 5 is a graph showing an example of the relation between gain and pumping light power in the preferred embodiment of the present invention.

FIG. 5 is a graph showing the relation between gain of each optical amplifier and total power of pumping light supplied to each doped fiber according to this preferred embodiment. Assuming that the power of pumping light supplied from the laser diodes 32 and 48 to the doped fibers 24 and 40, respectively, is 40 mW and that the power of pumping light not absorbed in but extracted from the doped fibers 24 and 40 is 10 mW, each of the doped fibers 24 and 40 is pumped by the pumping light having a total power of 50 mW in principle. Accordingly, when both the laser diodes 32 and 48 normally operate, each of the doped fibers 24 and 40 undergoes bidirectional pumping. The term of bidirectional pumping means that pumping light is supplied both in the signal light propagation direction of each doped fiber and in the direction opposite thereto. Further, the supply of pumping light in the signal light propagation direction of each doped fiber will be hereinafter referred to as forward pumping, and the supply of pumping light in the direction opposite to the signal light propagation direction will be hereinafter referred to as backward pumping.

Assuming that the laser diode 32 has failed and its pumping light output becomes zero, only the pumping light extracted from the doped fiber 40 pumped by the laser diode 48 is supplied to the doped fiber 24, so that the doped fiber 24 undergoes forward pumping. In this case, the pumping power is 10 mW, and the gain of the optical amplifier 18 becomes about several dB. Although this gain is smaller than about 30 dB which is the gain in the case of bidirectional pumping, the effect is very great. That is, unless the pumping light extracted in the optical amplifier 20 is supplied to the optical amplifier 18, there occurs large attenuation of signal light in the doped fiber 24, so that the optical amplifier 18 becomes a fatal defect in the system employing this optical repeater. Therefore, by using the pumping light extracted in the optical amplifier 20 to pump the doped fiber 24 in the optical amplifier 18, the above-mentioned large attenuation in the doped fiber 24 can be compensated to thereby prevent system down. For example, it is only necessary that a gain of several dB be obtained in an optical amplifier with a faulty pumping light source, whereby the lack of gain in an optical repeater including such a faulty optical amplifier can be compensated by another optical repeater, thus minimizing a deterioration in transmission characteristics due to the failure of the pumping light source.

According to this preferred embodiment as described above, the optical repeater can be made to have redundancy, thereby improving the reliability. Furthermore, the optical repeater can be simplified in configuration as compared with the prior art shown in FIG. 2 wherein the pumping light source is duplexed. Thus, the optical repeater with at least two optical amplifiers can be obtained at a low cost.

In an optical repeating transmission system, a technique of checking the presence or absence of faulty points (imperfect connection points, breakdown points, etc.) in optical fiber transmission lines and determining the positions of such faulty points is important for maintenance of the optical fiber transmission lines. To search for such faulty points and measurement of losses, OTDR (optical time-domain reflectometry) or OFDR (optical frequency-domain reflectometry) is performed. OTDR is a technique of evaluating the state in a fiber from a change of reflected light with time in relation to an optical pulse, and OFDR is a technique of using intensity-modulated light to sweep the modulated frequencies and evaluate the state in a fiber from the amplitude and the phase of a modulated component in reflected light. The reflected light used herein includes Fresnel reflected light and backward Rayleigh scattering light. In performing OTDR or OFDR (which will be hereinafter represented by OTDR), it is necessary to receive light from one end of an optical fiber transmission line and detect reflected light. Accordingly, in the case where an optical isolator is inserted in a main optical path, these techniques cannot be applied. In the optical amplifier 18 in the optical repeater shown in FIG. 3, for example, the optical isolator 28 is inserted in the main optical path, so that OTDR cannot be performed in the optical amplifier 18 only. The purpose of providing the optical isolator 28 in the optical amplifier 18 is to prevent the occurrence of undue oscillation or the like due to an optical resonator structure including the doped fiber 24 as an optical amplifying medium.

In this preferred embodiment, OTDR is allowed by connecting the port 30C of the optical coupler 30 and the port 46C of the optical coupler 46 through the optical fiber 56. It is assumed that there is a faulty point in the downstream fiber 14B of the up optical fiber transmission line 14 in a portion of the system shown in FIG. 3. Light for searching the faulty point from the upstream fiber 14A is passed through the optical amplifier 18 to reach the faulty point in the downstream fiber 14B. Reflected light propagates through the downstream fiber 14B leftward as viewed in FIG. 3 and is supplied to the optical amplifier 18. This reflected light is divided into two beams by the optical coupler 30. One of the two beams is blocked by the optical isolator 28, and the other is output from the port 30C. The reflected light output from the port 30C is transmitted through the optical fiber 56 and the optical coupler 46 in this order to the downstream fiber 16B of the down optical fiber transmission line 16. Accordingly, although the optical isolator 28 is inserted in the main optical path according to this preferred embodiment, OTDR can be applied to allow the search of faulty points, etc.

While the wavelength coupler 22 for extracting the pumping light and the wavelength coupler 26 for supplying the pumping light are located upstream and downstream of the doped fiber 24, respectively, in the optical amplifier 18 shown in FIG. 3 according to this preferred embodiment, the locations of these wavelength couplers may be reversed to each other. In this case of adopting such reversed locations, a photodiode for monitoring an input level may be preferably associated with the wavelength coupler for supplying the pumping light, and accompanying modifications may be also preferably made. Further, although the optical repeater of the above preferred embodiment has been applied to the bidirectional system, the optical repeater of the present invention can be applied also to the large-capacity system as shown in FIG. 1B. According to the present invention, it is possible to provide an optical repeater having high reliability and fit for cost reduction.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical repeater for amplifying signal light transmitted on first and second optical fiber transmission lines, the optical repeater comprising:

first and second optical amplifiers corresponding, respectively, to the first and second optical fiber transmission lines, each optical amplifier including a doped fiber doped with a rare earth element, said doped fiber being inserted in the corresponding optical fiber transmission line and having first and second ends, a pumping light source for producing pumping light, a supplying optical coupler operatively connected to said second end of said doped fiber, for receiving pumping light produced by said pumping light source and supplying said pumping light to said doped fiber, and an extracting optical coupler operatively connected to said first end of said doped fiber, said extracting optical coupler having an exchange port for extracting pumping light supplied to said doped fiber by said supplying optical coupler and passed through said doped fiber; and and an exchanging means, operatively connecting said exchange port of said extracting optical coupler of said first optical amplifier to said exchange port of said extracting optical coupler of said second optical amplifier, for exchanging pumping light between said first optical amplifier and said second optical amplifier.

2. An optical repeater according to claim 1, wherein said first and second optical fiber transmission lines transmit signal light in opposite directions.

3. An optical repeater according to claim 1, wherein:

said signal light has a first wavelength, said pumping light produced by said pumping light source of said first optical amplifier and said pumping light produced by said pumping light source of said second optical amplifier has a second wavelength different from said first wavelength, said first and second optical fiber transmission lines each include an upstream fiber and a downstream fiber operatively connected to an upstream side and a downstream side of said corresponding optical amplifier, respectively, said supplying optical coupler of said first optical amplifier and said supplying optical coupler of said second optical amplifier each include first, second, and third ports, said first port being operatively connected to said second end of said associated doped fiber, said second port being operatively connected to said downstream fiber of the corresponding optical fiber transmission line, and said third port being operatively connected to the associated pumping light source, said extracting optical coupler of optical amplifier and said extracting optical coupler of said second optical amplifier each include first and second ports in addition to said exchange port, said first port being operatively connected to said first upstream fiber of the corresponding optical fiber transmission line, and said second port being operatively connected to said first end of the associated doped fiber, and said exchanging means comprises an optical fiber operatively connected to said exchange port of said extracting optical coupler of said first optical amplifier and said exchange port of said extracting optical coupler of said second optical amplifier.

4. An optical repeater according to claim 3, wherein said extracting optical coupler of said first optical amplifier and said extracting optical coupler of said second optical amplifier each include a third port, and the optical repeater further comprises:

a first photodetector operatively connected to said third port of said extracting optical coupler of said first optical amplifier, and having a photodetecting band including said first wavelength; and a second photodetector operatively connected to said third port of said extracting optical coupler of said second optical amplifier, and having a photodetecting band including said first wavelength.

5. An optical repeater according to claim 1, wherein said rare earth element is erbium, said signal light has a wavelength in a band of 1.55 $\mu$m, and said pumping light produced by the pumping light source of the first optical amplifier and said pumping light produced by the pumping light source of the second optical amplifier has a wavelength in a band of 1.48 μm.

6. An optical repeater according to claim 1, wherein the supplying optical couplers of the first and second optical amplifiers and the extracting optical couplers of the first and second optical amplifiers are wavelength couplers manufactured by fusing/drawing a pair of optical fibers.

7. An apparatus for amplifying first and second light signals, comprising:

first and second light sources which each produce light;

a first amplifier which receives light produced by the first and second light sources and amplifies the first light signal with the received light;

a second amplifier which receives light produced by the first and second light sources and amplifies the second light signal with the received light; and first and second optical transmission lines, wherein
the first amplifier is positioned in the first optical transmission line,
the second amplifier is positioned in the second optical transmission line,
the first light signal travels along the first optical transmission line, and
the second signal travels along the second optical transmission line.

8. An apparatus as in claim 7, wherein
the first amplifier receives the entire light produced by the first light source and receives a portion of the light produced by the second light source after the second amplifier amplifies the second light signal with the light produced by the second light source, and
the second amplifier receives the entire light produced by the second light source and receives a portion of the light produced by the first light source after the first amplifier amplifies the first light signal with the light produced by the first light source.

9. An apparatus as in claim 7, wherein the apparatus is an optical repeater and the first light signal travels in the opposite direction from the second light signal.

10. An apparatus as in claim 9, wherein
a portion of the light received by the first amplifier from the first light source remains after the first amplifier amplifies the first light signal, the remaining portion being output by the first amplifier to the first optical transmission line,
a portion of the light received by the second amplifier from the second light source remains after the second amplifier amplifies the second light signal, the remaining portion being output by the second amplifier to the second optical transmission line, and
the apparatus further comprises
a first optical coupler positioned in the first optical transmission line, the first optical coupler decoupling the remaining portion of light from the first optical transmission line and providing the remaining portion of light to the second amplifier, the second amplifier amplifying the second light signal with the remaining portion of light, and
a second optical coupler positioned in the second optical transmission line, the second optical coupler decoupling the remaining portion of light from the second optical transmission line and providing the remaining portion of light to the first amplifier, the first amplifier amplifying the first light signal with the remaining portion of light.

11. An apparatus as in claim 7, wherein the first and second amplifiers are optical amplifiers and the first and second light sources are laser diodes which produce pump light for amplifying the first and second light signals.

12. An apparatus for amplifying first and second light signals, comprising:

first and second amplifiers which receive amplifying light from first and second light sources, respectively;

first and second optical transmission lines, the first amplifier being positioned in the first optical transmission line, the second optical amplifier being positioned in the second optical transmission line, the first light signal travels along the first optical transmission line and the second light signal travels along the second optical transmission line; and a exchanging mechanism which provides a portion of the amplifying light received by the second amplifier to the first amplifier, and provides a portion of the amplifying light received by the first amplifier to the second amplifier, wherein the first amplifier amplifies the first light signal with light received from the first light source and the portion provided to the first amplifier by the exchanging mechanism, and the second amplifier amplifies the second light signal with light received from the second light source and the portion provided to the second amplifier by the exchanging mechanism.

13. An apparatus as in claim 12, wherein the apparatus is an optical repeater and the first light signal travels in the opposite direction from the second light signal.

14. An apparatus as in claim 12, wherein
a portion of the light received by the first amplifier from the first light source remains after the first amplifier amplifies the first light signal, the remaining portion being output by the first amplifier to the first optical transmission line,
a portion of the light received by the second amplifier from the second light source remains after the second amplifier amplifies the second light signal, the remaining portion being output by the second amplifier to the second optical transmission line, and
the exchanging mechanism includes
a first optical coupler positioned in the first optical transmission line, the first optical coupler decoupling the remaining portion of light from the first optical transmission line and providing the remaining portion of light to the second amplifier, the second amplifier amplifying the second light signal with the remaining portion of light, and
a second optical coupler positioned in the second optical transmission line, the second optical coupler decoupling the remaining portion of light from the second optical transmission line and providing the remaining portion of light to the first amplifier, the first amplifier amplifying the first light signal with the remaining portion of light.

15. An apparatus as in claim 12, wherein the first and second amplifiers are optical amplifiers and the first and second light sources are laser diodes which produce pump light for amplifying the first and second light signals.

16. An apparatus for amplifying first and second light signals traveling through first and second transmission lines, respectively, the apparatus comprising:

first and second optical amplifiers positioned in the first and second transmission lines, respectively, and which receive pump light from first and second laser diodes, respectively; and a exchanging mechanism which provides a portion of the pump light received by the second optical amplifier to the first optical amplifier, and provides a portion of the pump light received by the first optical amplifier to the second optical amplifier, wherein the first optical amplifier amplifies the first light signal with pump light received from the first laser diode and the portion provided to the first optical amplifier by the exchanging mechanism, and the second optical amplifier amplifies the second light signal with pump light received from the second laser diode and the portion provided to the second optical amplifier by the exchanging mechanism.

17. An apparatus for amplifying first and second optical signals traveling in first and second transmission lines, respectively, the apparatus comprising:

a first optical amplifier positioned in the first transmission line and pumped with pump light to amplify the first optical signal as the first optical signal travels through the first transmission line; and a second optical amplifier positioned in the second transmission line and pumped with pump light to amplify the second optical signal as the second optical signal travels through the second transmission line, wherein pump light remaining in the first optical amplifier after amplifying the first optical signal is provided to the second optical amplifier as additional pump light to amplify the second optical signal, and pump light remaining in the second optical amplifier after amplifying the second optical signal is provided to the first optical amplifier as additional pump light to amplify the first optical signal.

18. An apparatus for amplifying first and second optical signals traveling in first and second transmission lines, respectively, the apparatus comprising:

a first optical amplifier positioned in the first transmission line and pumped with pump light to amplify the first optical signal as the first optical signal travels through the first transmission line;

a second optical amplifier positioned in the second transmission line and pumped with pump light to amplify the second optical signal as the second optical signal travels through the second transmission line;

means for causing pump light remaining in the first optical amplifier after amplifying the first optical signal to be provided to the second optical amplifier as additional pump light to amplify the second optical signal; and means for causing pump light remaining in the second optical amplifier after amplifying the second optical signal to be provided to the first optical amplifier as additional pump light to amplify the first optical signal.

19. An optical communication system comprising:

first and second transmission lines through which first and second optical signals travel, respectively;

a first optical amplifier positioned in the first transmission line and pumped with pump light to amplify the first optical signal as the first optical signal travels through the first transmission line; and a second optical amplifier positioned in the second transmission line and pumped with pump light to amplify the second optical signal as the second optical signal travels through the second transmission line, wherein pump light remaining in the first optical amplifier after amplifying the first optical signal is provided to the second optical amplifier as additional pump light to amplify the second optical signal, and pump light remaining in the second optical amplifier after amplifying the second optical signal is provided to the first optical amplifier as additional pump light to amplify the first optical signal.

20. A method for amplifying first and second optical signals traveling in first and second transmission lines, respectively, the apparatus comprising:

amplifying the first optical signal as the first optical signal travels through the first transmission line with a first optical amplifier positioned in the first transmission line and pumped with pump light to amplify the first optical signal;

amplifying the second optical signal as the second optical signal travels through the second transmission line with a second optical amplifier positioned in the second transmission line and pumped with pump light to amplify the second optical signal;

causing pump light remaining in the first optical amplifier after amplifying the first optical signal to be provided to the second optical amplifier to amplify the second optical signal; and causing pump light remaining in the second optical amplifier after amplifying the second optical signal to be provided to the first optical amplifier to amplify the first optical signal.

21. An apparatus comprising:

a first optical amplifier positioned in a first transmission line and provided with pump light to amplify a light signal traveling through the first transmission line; and a second optical amplifier positioned in a second transmission line and provided with pump light to amplify a light signal traveling through the second transmission line, wherein remaining pump light in the first optical amplifier is provided to the second optical amplifier as additional pump light to amplify the light signal traveling through the second transmission line, and remaining pump light in the second optical amplifier is provided to the first optical amplifier as additional pump light to amplify the light signal traveling through the first transmission line.

22. An apparatus as in claim 21, wherein the light signal traveling through the first transmission line travels in a different direction then the light signal traveling through the second transmission line.

23. An apparatus as in claim 21, wherein the apparatus is a repeater.

24. An apparatus as in claim 22, wherein the apparatus is a repeater.

* * * * *